Feb. 22, 1966     F. J. ZELMAN ETAL     3,236,407
REPAIR PATCH ASSEMBLY
Filed Jan. 30, 1964
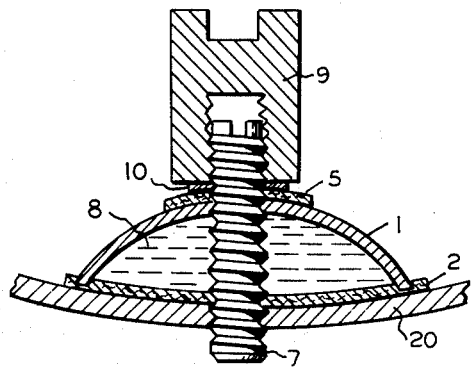
FIG.1
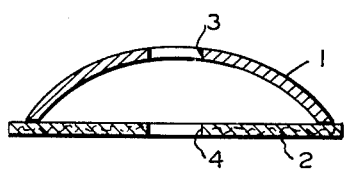
FIG 2
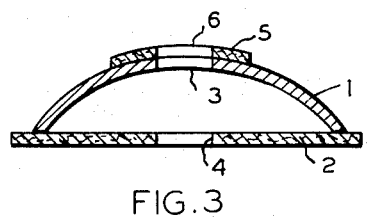
FIG.3
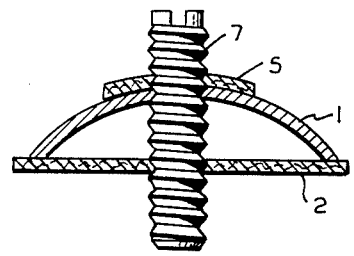
FIG.4
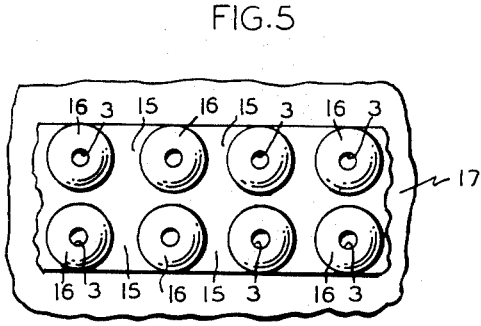
FIG.5
FIG.6
INVENTOR
Frederick J. Zelman
Samuel S. Graziano
Edwin Schlesinger
BY
ATTORNEY

United States Patent Office 3,236,407
Patented Feb. 22, 1966

3,236,407
REPAIR PATCH ASSEMBLY
Frederick J. Zelman, Roselle, and Samuel S. Graziano, Linden, N.J., and Edwin Schlesinger, Auburn, Ala., assignors to General Aniline & Film Corporation, New York, N.Y., a corporation of Delaware
Filed Jan. 30, 1964, Ser. No. 341,322
15 Claims. (Cl. 220—24)

This invention relates to a repair patch assembly and more specifically to a repair patch assembly wherein the exposed surfaces thereof consist of corrosion-resistant material and which advantageously is adapted for use in the repair of corrosion-resistant equipment such as glass, or vitreous-lined metal vessels and the like.

The utilization is widespread of metal vessels, containers and the like equipment wherein the metal is provided with a corrosion-resistant coating of glass or vitreous enamel in the processing, handling, and/or storage of corrosive chemicals and chemical systems. During fabrication and/or during the life of the vessel, defects such as cracks, pinholes, chips and the like frequently develop in the corrosion-resistant lining thereof. It is necessary to immediately repair such defects in order to prevent the occurrence of further damage to the vessel walls by a concentrated corrosive attack at the thus exposed metal area by the corrosive chemical or system being handled.

In the ideal situation, the method for repairing such defects would entail a reapplication to the damaged area of the material from which the original corrosion-resistant lining was formed. Due to the characteristics of the materials employed to provide such corrosion-resistant linings, however, a reapplication of material common to the lining includes procedures with attendant expenditures which render such a technique commercially prohibitive. For example, when it is attempted to repair a defect in the lining of a glass-lined vessel by a procedure which involves local heating of the damaged area, glass in the undamaged lining of the vessel adjacent the defect is likely and most frequently does develop cracks therein; consequently, in order to minimize the possibility of such additional cracks developing, it undesirably is necessary to heat the entire glass-lined assembly to glass-fusing temperatures of about 1600° F.

One technique employed in repairing defects in such corrosion-resistant linings formed of glass, enamel and the like entails initially grinding out the area adjacent the defect with a dental drill to provide an undercut cavity in the lining surrounding the damaged area and then inserting an inlay of a corrosion-resistant metal such as gold or silver within the cavity. This method, however, has not proved entirely satisfactory due to the requisite use of relatively expensive metals and the attendant labor expenditures. Moreover, the metal inlays thereby provided do not function completely satisfactorily due to the substantial difference between the coefficients of thermal expansion of the metal inlays and the glass or enamel of the lining and a lack of sufficient mutual adherence between the inlay and lining materials.

An alternative method employed in the repair of such damaged corrosion-resistant linings utilizes a repair patch which is placed over the damaged area and maintained thereagainst by means of studs which are screwed into tapped holes in the metal wall of the vessel. The use of such repair patches has not yielded completely satisfactory results in that the materials employed in forming the repair patches either do not provide a repaired lining which is completely corrosion-resistant and/or are characterized by physical properties which limit the use thereof in equipment operating within relatively narrow conditions. For example, the suggested use of metallic repair patches unsatisfactorily has resulted in repaired linings characterized by local areas subject to corrosion. The utilization of repair patches formed of corrosion-resistant synthetic materials such as fluoro-hydrocarbon resins, while providing a high degree of protection to corrosion at relatively low temperature conditions, unsuitably provides a coating for the damaged area which is subject to a tendency to yield under continued thermal stress and expose the damaged area of the vessel to the corrosive material being handled at temperatures above about 450° F.

Accordingly, it is the primary object of the present invention to provide a repair patch assembly which simply and efficiently may be employed in repairing damaged areas of corrosion-resistant equipment and which when used provides a repaired lining which is not subject to the disadvantages attendant the use of repair patches heretofore available.

Another object of the present invention is to provide a repair patch assembly which advantageously may be employed in the repair of defects in the lining of corrosion-resistant equipment to provide a repaired lining which is free of corrosive areas.

It is an additional object of the present invention to provide a repair patch assembly formed of readily available and relatively inexpensive materials.

It is a further object of the present invention to provide a repair patch assembly, for use in repairing a defect in the corrosion-resistant lining of equipment, which may be applied to the damaged area without any extensive preparation, involving grinding and the like, of the damaged area for receipt of the repair patch assembly.

Yet another object of the present invention is to provide a repair patch assembly, for use in the repair of corrosion-resistant linings of equipment, which when in use exposes a surface which is corrosion-resistant and which by virtue of its physical properties advantageously is adapted to maintain the defect covered thereby in repair over the range of operating conditions for which the lined vessel originally was intended to be operative.

It is still an additional object of the present invention to provide a repair patch assembly which advantageously may be employed in the repair of a defect in the corrosion-resistant lining of vessels to provide a repaired area which does not fail when subjected to thermal stress.

Yet another object of the present invention is to provide a method for the repair of a defect in the corrosion-resistant lining of a vessel which is relatively simple and provides a highly efficient technique as compared to similar technique heretofore available for effecting the desired repair.

Broadly described, the present invention provides a repair patch assembly which comprises a sheet of metal having at least one raised portion therein defining a dome, said metal sheet having on the surfaces thereof a film coating of a corrosion-resistant fluoro-hydrocarbon resin and said metal sheet having an aperture in said domed portion, and a corrosion-resistant gasket adhesively attached to the said resin-coated metal sheet at the periphery of the base of said dome, and covering the cavity formed in said metal sheet by said dome, said gasket being formed of a felt of fluoro-hydrocarbon fibers which felt is impregnated with a fluoro-hydrocarbon and has an aperture therein which is coaxial with said aperture in said dome.

The invention further contemplates embodiments comprising an assembly as described above which is further provided with a metal rod adhesively attached to said resin-coated metal sheet and gasket and positioned within said apertures to have the ends thereof extend through said apertures in said resin-coated dome and said gasket with or without a reservoir of corrosion-resistant cement located within and filling the cavity formed within said dome by said adhesively attached dome, gasket, and rod.

The term "dome" as employed in the specification and claims is intended to refer to raised portions in the metal sheet of the assembly of the invention of any size and configuration. Preferably the dome or raised region formed in the metal sheet of the assembly has a height of less than about 1 inch and is generally hemispherical in shape.

The invention contemplates embodiments of the repair patch assembly wherein the metal sheet thereof is provided with one or a plurality of domed regions therein. In the embodiments wherein a plurality of domed regions are present, the metal sheet (in each of the domed regions of the sheet) is provided with an aperture adapted for receiving a rod therein. Embodiments of the repair patch assembly of the present invention wherein only a single dome is formed in the metal sheet advantageously are adapted to be utilized in the repair of relatively small and minor defects in a corrosion-resistant lining of a vessel. Embodiments wherein a plurality of domed regions are formed in the metal sheet suitably are adapted for use in the repair of damaged areas of the corrosion-resistant lining having a greater surface area.

The metal sheet of the repair patch suitably may be of a configuration such that the gasket adhering to the base thereof defines a flat or curved surface which conforms to the shape and configuration of the wall to be repaired and protected. For simplicity of construction the base of the repair patch assemblies of the present invention preferably is generally circular, or rectangular in configuration. The base of the assembly also suitably may be irregular in shape. In those patches containing a plurality of domed regions the domed regions preferably are of the same size and are positioned in a symmetrical pattern within the area of the metal sheet.

The invention contemplates the utilization of any metals and alloys conventionally employed in the fabrication of sheets in forming the domed metal sheet of the assembly. The more commonly known and available metals such as steel, stainless steel, copper, nickel, Hastelloy, Inconel, Tantalum and the like are preferred. In order to provide secondary protection of the damaged corrosion-resistant lining to be repaired by the assembly, it is desirable, in some cases, to form the metal sheet from the metal most resistant to the corrosive material to be handled in the lined vessel. The thickness of the sheet suitably may vary and usually is in the range of from about 0.1 to about 0.25 inch. It is preferred in most instances that the thickness be such that the dome formed therein does not deform substantially when the assembly is in a tightened position covering the defect to be repaired thereby.

The corrosion resistant gaskets employed in the repair patch assemblies in the present invention suitably may consist of any gasket material formed of a felt of fluoro-hydrocarbon fibers impregnated with sufficient fluoro-hydrocarbon resin to provide a resilient felt mat in which the fibers thereof are adhesively joined. A specific example of a preferred embodiment of the gasket material is a polytetrafluoroethylene fibrous structure impregnated and bonded with fluorinated polymers or copolymers of ethylinically unsaturated compounds, which bonding and impregnating polymers are characterized by having a coalescence temperature in the range of 20° F. to 250° F. lower than that of the polytetrafluoroethylene fibers. Specific examples of the binding polymers include homopolymers of dichlorodifluoroethylene, trichloromonofluoroethylene, vinyl fluoride, vinylidene fluoride, and 2-fluoro-1,3-butadiene and copolymers of monochlorotrifluoroethylene or tetrafluoroethylene with ethylinically unsaturated hydrocarbons such as ethylene, propylene and the like. Additional examples of the gasket material employed in the invention are given in U.S. Patent No. 2,773,781. The impregnated felt mat usually has a thickness of from about 0.1 to about 0.55 inch, preferably from about 0.1 to about 0.25 inch.

The fluoro-hydrocarbon resin employed in the film coating on the domed metal sheet and in the gasket of the assembly suitably may be any normally solid fluoro-hydrocarbon resin which is characterized by resistance to attack by acids and alkali. Specific examples of such fluoro-hydrocarbon resins are polytetrafluoroethylene and polymonochlorotrifluoroethylene, sold commercially under the tradenames of Teflon and Kel-F Elastomer, respectively. Such resins and their method of preparation are well-known, as exemplified by the disclosures of U.S. Patent Nos. 2,393,967; 2,534,058; 2,579,437; and 2,613,202.

The cement employed in the cavity formed by the cooperating dome, gasket, and rod of the assembly of the present invention suitably may be any conventional corrosion-resistant cement. Examples of suitable cements include, without limitation, carbon-filled, acid-proof, phenol-formaldehyde resin cements and quick-setting, self-hardening, sodium silicate cements, sold commercially under the tradenames of Carbo-Korez and Pennchlor, respectively. A sufficient amount of the cement is used in the assembly to completely fill the above-described cavity.

In preparing the assembly of the present invention the domed metal sheet thereof initially is formed and provided with apertures in the domes by a stamping, punching and the like technique. The perforated dome-containing sheet is then coated with a film of the fluoro-hydrocarbon resin.

The fluoro-hydrocarbon resin film coating may be formed on the perforated domed sheet material of the assembly by any suitable manner. For example, the application of the coating on the domed metal sheet may be carried out by heating the metal sheet to a temperature above the melting point of the fluoro-hydrocarbon resin and suspending the heated sheet in a fluidized bed of finely divided fluoro-hydrocarbon particles. The desired thickness of the coating may be achieved by repeating the sheet-heating and fluidized-resin-bed contacting steps the requisite number of times. The heated metal sheet preferably is rotated within the fluidized bed sufficiently to insure that a resin coating is applied to all surfaces of the metal sheet. While the thickness of the fluoro-hydrocarbon resin coating applied to the metal sheet suitably may vary over a relatively wide range, generally it is preferred that the thickness be at least 0.006 to about 0.01 inch.

Alternatively, the corrosion-resistant fluoro-hydrocarbon resin coating may be applied to the domed metal sheet by conventional spray coating, film coating and the like techniques.

Following the coating of the metal sheet with the fluoro-hydrocarbon resin film, the resin coating preferably is tested by a magnetic or electric conductive technique to insure that the film coating is continuous and pore-free.

The gasket of the assembly is then formed from a resilient felt mat of the type described by cutting the gasket to such a shape and size that when the gasket is adhesively joined to the resin-coated domed sheet of the assembly all of the cavities in the sheet formed by the raised dome regions therein are covered by the gasket. Preferably the gasket is of the same general shape as the metal sheet. Apertures are formed in the gasket which are coaxial to those in the domed sheet when the sheet and gasket are joined in assembled condition.

The resin-coated domed sheet and gasket are then joined together by placing the gasket against the domed sheet to cover the cavities formed in said sheet by said domed regions with the apertures in the sheet and the gasket being aligned to be coaxial and then maintaining the sheet and gasket in contact while heating the combination to resin-fusing temperatures. Alternatively, the gasket is bonded to the resin-coated sheet by initially heating the resin-bearing sheet to melt the resin in the coating and then bringing the gasket with the proper alignment into contact therewith under pressure. The bonding of the sheet and gasket of the assembly also suitably may be carried out utilizing a corrosion-resistant cement of the type used in the cement reservoir of the assembly.

The bonding of the resin-coated sheet to the gasket suitably may be carried out preliminary to the contemplated use of the assembly or at the actual time of repair of a defect in a vessel lining. When bonding is carried out as in the former instance the invention advantageously provides a compact prefabricated assembly which requires relatively little effort and skill to be successfully utilized in repairing defects in vessel walls.

The assembly of the invention suitably may be prefabricated for later use in the above-described form without a further combination therewith of other elements actually present in the complete repair patch in tightened condition at the time of ultimate repair.

The invention also contemplates embodiments of the repair patch assembly wherein such additional elements are present in a prefabricated assembly.

In one embodiment of such additional prefabricated assemblies each of the domes or raised portions of the resin-coated metal sheet are provided with a second gasket bonded to the top thereof and formed of the same resin-impregnated felt mat as that bonded to the base of the sheet. This second gasket also is provided wtih an aperture which is positioned to be co-axial with the aperture in the dome of the sheet. Such a second gasket may be bonded to the top of the dome in the same manner as the sheet base gasket. While the gasket on the top of the dome suitably may vary in size and may even extend over several or all of the domes present, if more than one is present, preferably the second gasket is of such a size that it covers only the upper area of the domed or raised portion. In instances wherein the second gasket on the top of the resin-coated sheet extends over several domes in the sheet the gasket is provided with an aperture for each dome which is in alignment with the aperture in each dome.

In further embodiments of the repair patch of the present invention the resin-coated sheet to which is bonded the base gasket, with or without the dome-top gasket also being present, also is provided with a metal rod which is positioned within the coaxial apertures in the dome of the sheet and the base gasket so that the ends of the rod extend out of said apertures. The ends of the rod preferably are threaded to be adapted to receive a threaded nut. The rod is snuggly fitted within said aperture and adhesively and/or frictionally attached to said sheet and gasket or gaskets, if a dome-top gasket is present. In some embodiments of the present repair patch assembly the rod is provided with a film coating of the above-described fluoro-hydrocarbon resin. In such instances the rod suitably may be bonded to the other elements of the assembly by the same techniques described above for attaching the base gasket to the resin-coated metal sheet. In further embodiments wherein the rod is free of a fluoro-hydrocarbon resin coating, the rod may be maintained in place within the assembly by means of threads which are provided both on the rod and within the aperture in the resin-coated metal sheet and/or by a corrosion-resistant cement of the type used in the cement reservoir of the assembly.

The invention will be more fully understood from the following description of the accompanying drawings of which:

FIGURE 1 is a side cutaway view of a preferred embodiment of a complete repair patch assembly of the invention in tightened position on the wall of a vessel having a corrosion-resistant lining;

FIGURE 2 is a side cutaway view of an embodiment of a repair patch assembly of the invention consisting of a combination of a resin-coated sheet having a single domed portion therein and a gasket;

FIGURE 3 is a side cutaway view of an embodiment of the repair patch assembly of the invention which is a combination of a resin-coated sheet having a single domed area and a gasket positioned on both its base and top;

FIGURE 4 is a side cutaway view of a further embodiment of the repair patch assembly of the invention shown in FIGURE 3 wherein the assembly also is provided with a threaded rod for attachment to a lining to be repaired thereby;

FIGURE 5 is a side cutaway view of an embodiment of a repair patch assembly of the invention consisting of a combination of a gasket and a resin-coated sheet having a plurality of domed regions therein; and FIGURE 6 is a top view of the repair patch assembly shown in FIGURE 5.

In the drawings like numerals refer to like elements of the repair patch assemblies shown.

With reference to FIGURE 1, element 1 is a metal sheet having a domed region therein and provided with a thin coating of a fluoro-hydrocarbon resin. The resin-coated sheet 1 is adhesively attached at the periphery of its base to a gasket 2 which is formed of a felt of fluoro-hydrocarbon resin fibers impregnated with fluoro-hydrocarbon resin. The gasket 2 is of such a size that its edges extend beyond the base of resin-coated sheet 1. A prefabricated assembly of resin-coated sheet 1 and gasket 2 is shown in FIGURE 2. The resin-coated sheet 1 is provided at its top with a second gasket 5 which is formed of the same material as gasket 2 and which is adhesively attached to resin-coated sheet 1. FIGURE 3 shows a prefabricated assembly of resin-coated sheet 1 and gaskets 2 and 5. The gaskets 2 and 5 may be attached to the resin-coated sheet 1 either by means of a fusion of the resin coating of the respective elements or by means of a corrosion-resistant cement.

The resin-coated sheet 1, gasket 2 and gasket 5 are provided with apertures therein 3, 4 and 6, respectively, which are positioned with respect to one another to be coaxial (FIGURES 2 and 3). A threaded rod 7 is positioned within said apertures in the resin-coated metal sheet 1 and gaskets 2 and 5 and has the ends thereof extending through said apertures. The rod 7 may or may not have a fluoro-hydrocarbon coating thereon of the type present on the resin-coated sheet 1 and is frictionally and/or adhesively attached to the resin-coated sheet 1 and gaskets 2 and 5. The adhesive attachment of the rod 7 to the resin-coated sheet 1 may be through a fused bond of fluoro-hydrocarbon resin, if any is present on the rod, or through a bond of the aforementioned corrosion-resistant cement. A prefabricated assembly of the resin-coated sheet 1, gaskets 2 and 5, and rod 7 is shown in FIGURE 4.

The cavity formed within the resin-coated sheet 1, by said sheet and gasket 2 and rod 7 is filled with a reservoir of corrosion-resistant cement 8. The threaded end of rod 7 extending through the aperture 4 of gasket 2 is fitted into a hole tapped in the wall 20 of a corrosion-resistant lined vessel. The threaded end of rod 7 extending through aperture 3 of gasket 5 is adapted with a nut 9 which is formed of a cooperating metal nut coated with a thin film of fluoro-hydrocarbon resin as in the case of the sheet 1. The nut 9 is in tightened position on rod 7 and thus maintains the assembly firmly against the wall 20 of the vessel. The tightened position of nut 9 causes the periphery of the base of resin-coated sheet 1 to be depressed into gasket 2 and pinches the gasket in the areas contacted thereby against wall 20 to thereby effect a sealing of the areas covered by sheet 1. The corrosion-resistant cement in cement reservoir 8, due to the pressure exerted thereon by the lightening of nut 9, is forced into the interstices of the gasket and into the joints of the assembly to further effect the sealing off of the area covered by the assembly. To insure that the joint between nut 9, gasket 5 and rod 7 is completely sealed a coating 10 of the corrosion-resistant cement therebetween may be utilized. All exposed surfaces of the assembly, so provided, are thereby non-metallic and corrosion-resistant.

With reference to FIGURES 5 and 6, element 15 is a metal sheet having a thin coating of fluoro-hydrocarbon resin thereon and in which are formed a plurality of domed regions 16, each of which is provided with an aperture 3 therein. The resin-coated sheet 15 is provided with a gasket 17 of the type shown in FIGURES 1 to 4 which extends beyond the area in which the domed portions 16 are located. The gasket 17 is provided with a plurality of apertures 4, each of which is located therein to be coaxial with an aperture 3 in the resin-coated sheet 15. The multi-domed assembly shown in FIGURES 5 and 6 may be employed for the repair of defects in the corrosion-resistant lining of a vessel in the same manner as the single-domed assembly of the invention represented in FIGURES 1 to 4.

While additional modifications and variations of the repair patch assembly of the present invention which do not depart from the spirit of the invention will be apparent to those skilled in the art from the above description, it is intended that the invention be limited only by the scope of the appended claims.

What is claimed is:

1. A repair patch assembly which comprises a sheet of metal having at least one raised portion therein defining a dome, said metal sheet having on the surfaces thereof a film coating of a corrosion-resistant fluoro-hydrocarbon resin and said metal sheet having an aperture in said domed portion, and a corrosion-resistant gasket adhesively attached to the said resin-coated metal sheet at the periphery of the base of said dome, and covering the cavity formed in said metal sheet by said dome, said gasket being formed of a felt of fluoro-hydrocarbon fibers which felt is impregnated with a fluoro-hydrocarbon and has an aperture therein which is coaxial with said aperture in said dome.

2. The repair patch assembly according to claim 1 wherein said raised region in said metal sheet is hemispherical in shape.

3. The repair patch assembly according to claim 1 wherein said metal sheet is provided with a plurality of raised regions therein defining domes.

4. The repair patch assembly according to claim 1 wherein the thickness of said resin film coating on said metal sheet is in the range of from about 0.006 to about 0.01 inch.

5. The repair patch assembly according to claim 1 wherein said gasket is adhesively bonded to said resin-coated metal sheet by means of a corrosion-resistant cement.

6. The repair patch assembly according to claim 1 wherein said gasket is adhesively bonded to said resin-coated metal sheet by fusion between said resin in said coating on said metal sheet and said resin in said gasket.

7. The repair patch assembly according to claim 1 wherein a second gasket is positioned on and adhesively attached to the top of each of said raised portions in said resin-coated metal sheet, said second gasket being formed of a felt of fluoro-hydrocarbon fibers, which felt is impregnated with a fluoro-hydrocarbon resin and has an aperture therein which is coaxial with said aperture in said resin-coated metal sheet.

8. A repair patch assembly which comprises a sheet of metal having at least one raised portion therein defining a dome, said metal sheet having on the surfaces thereof a film coating of a corrosion-resistant fluoro-hydrocarbon resin and said metal sheet having an aperture in said domed portion, a corrosion-resistant gasket adhesively attached to the said resin-coated metal sheet at the periphery of the base of said dome, and covering the cavity formed in said metal sheet by said dome, said gasket being formed of a felt of fluoro-hydrocarbon fibers which felt is impregnated with a fluoro-hydrocarbon and has an aperture therein which is coaxial with said aperture in said dome, and a metal rod adhesively attached to said resin-coated metal sheet and said gasket and positioned within said apertures in said resin-coated metal sheet and said gasket to have the ends thereof extend through said apertures.

9. The repair patch assembly according to claim 8 wherein said raised region in said metal sheet is hemispherical in shape.

10. The repair patch assembly according to claim 8 wherein said metal sheet is provided with a plurality of raised regions therein defining domes.

11. The repair patch assembly according to claim 8 wherein the thickness of said resin film coating on said metal sheet is in the range of from about 0.006 to about 0.01 inch.

12. The repair patch assembly according to claim 8 wherein said gasket is adhesively bonded to said resin-coated metal sheet by means of a corrosion-resistant cement.

13. The repair patch assembly according to claim 8 wherein said gasket is adhesively bonded to said resin-coated metal sheet by fusion between said resin in said coating on said metal sheet and said resin in said gasket.

14. The repair patch assembly according to claim 8 wherein a second gasket is positioned on and adhesively attached to the top of each of said raised portions in said resin-coated metal sheet, said second gasket being formed of a felt of fluoro-hydrocarbon fibers, which felt is impregnated with a fluoro-hydrocarbon resin and has an aperture therein which is coaxial with said aperture in said resin-coated metal sheet.

15. The repair patch assembly according to claim 8 wherein a reservoir of corrosion-resistant cement is located within and fills the cavity formed within said dome by said adhesively attached dome, gasket, and rod.

References Cited by the Examiner

UNITED STATES PATENTS

| | | | |
|---|---|---|---|
| 2,007,179 | 7/1935 | Bullis | 220—25 |
| 2,416,548 | 2/1947 | Schaul | 220—25 |

THERON E. CONDON, *Primary Examiner.*